(12) United States Patent
Branum

(10) Patent No.: US 6,303,739 B2
(45) Date of Patent: Oct. 16, 2001

(54) METHOD OF PREPARING POLYETHYLENE GLYCOL MODIFIED POLYESTER FILAMENTS

(75) Inventor: James Burch Branum, Fort Mill, SC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

(21) Appl. No.: 09/730,445

(22) Filed: Dec. 5, 2000

Related U.S. Application Data

(62) Division of application No. 09/444,192, filed on Nov. 19, 1999.

(51) Int. Cl.$^7$ .................................................. C08G 64/02
(52) U.S. Cl. .......................................... 528/271; 528/272
(58) Field of Search ................................ 528/271, 272; 264/176.1

(56) References Cited

U.S. PATENT DOCUMENTS

| | | |
|---|---|---|
| 2,623,031 | 12/1952 | Snyder . |
| 2,744,087 | 5/1956 | Snyder . |
| 3,576,773 | 4/1971 | Vaginay . |
| 3,926,551 | 12/1975 | Okada et al. . |
| 4,049,621 | 9/1977 | Gilkey et al. . |
| 4,092,299 | 5/1978 | MacLean et al. . |
| 4,113,704 | 9/1978 | MacLean et al. . |
| 4,167,395 | 9/1979 | Engelhardt et al. . |
| 4,207,230 | 6/1980 | Bier et al. . |
| 4,587,154 | 5/1986 | Hotchkiss et al. . |
| 4,666,454 | 5/1987 | DeMartino et al. . |
| 4,705,525 | 11/1987 | Abel et al. . |
| 4,785,060 | 11/1988 | Nagler . |
| 4,827,999 | 5/1989 | Yabuki et al. . |
| 4,975,233 | 12/1990 | Blaeser et al. . |
| 5,089,533 | 2/1992 | Park . |
| 5,091,504 | 2/1992 | Blaeser et al. . |
| 5,097,004 | 3/1992 | Gallagher et al. . |
| 5,223,317 | 6/1993 | Corbin et al. . |
| 5,709,940 | 1/1998 | George et al. . |
| 5,902,539 | 5/1999 | Schmidt et al. . |

FOREIGN PATENT DOCUMENTS

| | | |
|---|---|---|
| 0 985 752 A | 3/2000 | (EP) . |
| 2 021 652 A | 12/1979 | (GB) . |
| 03174076 A | 7/1991 | (JP) . |
| 04041732 A | 2/1992 | (JP) . |
| 04041738 A | 2/1992 | (JP) . |
| 2932614 | 2/1992 | (JP) . |
| 05295673 A | 11/1993 | (JP) . |
| 82333 B | 9/1983 | (RO) . |
| 83208 B | 1/1984 | (RO) . |
| WO 99/19548 A | 4/1999 | (WO) . |
| WO 00/12793 A1 | 3/2000 | (WO) . |

*Primary Examiner*—Terressa M. Boykin
(74) *Attorney, Agent, or Firm*—Summa & Allan, P.A.

(57) ABSTRACT

Disclosed is a method of copolymerizing polyethylene glycol (PEG) into polyethylene terephthalate (PET) to achieve a polyethylene glycol-modified polyester composition that can be spun into filaments. The method includes the steps of copolymerizing polyethylene glycol into polyethylene terephthalate in the melt phase to form a copolyester composition, then polymerizing the copolyester composition in the solid phase until the copolyester is capable of achieving a melt viscosity that facilitates the spinning of filaments, and thereafter spinning filaments from the copolyester. A copolyester composition comprised of polyethylene glycol and polyethylene terephthalate is also disclosed. Fabrics made from fibers formed from the copolyester composition possess wetting, wicking, drying, flame-retardancy, static-dissipation, and soft hand properties that are superior to those of fabrics formed from conventional polyethylene terephthalate fibers of the same yarn and fabric construction.

20 Claims, 8 Drawing Sheets

METHOD OF PREPARING POLYETHYLENE GLYCOL MODIFIED POLYESTER FILAMENTS

CROSS-REFERENCE TO RELATED APPLICATION

This application is a division of copending U.S. application Ser. No. 09/444,192, filed Nov. 19, 1999.

FIELD OF THE INVENTION

The present invention relates to the production of polyethylene glycol modified polyester fibers. The present invention also relates to the manufacture of yarns and fabrics from these copolyester fibers.

BACKGROUND OF THE INVENTION

Polyester filament is strong, yet lightweight, and has excellent elastic memory characteristics. Polyester fabric resists wrinkles and creases, retains its shape in garments, resists abrasions, dries quickly, and requires minimal care. Because it is synthetic, however, polyester is often considered to have an unacceptable appearance for garment purposes when initially formed as a filament. Accordingly, polyester filaments require texturing to produce acceptable characteristics of appearance, hand, and comfort in yarns and fabrics. Even then, polyester is often viewed unfavorably in garments.

In pursuit of improved polyesters, various chemical modifications have been attempted to obtain desirable textile features. Unfortunately, some such treatments can produce unexpected or unwanted characteristics in the modified polyester. For example, polyethylene glycol enhances certain polyester properties, such as dye uptake, but diminishes other properties, especially those melt phase characteristics that are critical to filament spinning. Consequently, manufacturers have found that significant fractions of polyethylene glycol in copolyester can complicate—and even preclude—the commercial production of acceptable copolyester filaments. To gain commercial acceptance, modified polyesters must be compatible with commercial equipment with respect to melt-spinning, texturing, yarn spinning, fabric forming (e.g., weaving and knitting), and fabric finishing. This need for processing compatibility through conventional equipment has constrained the development of innovative polyester compositions.

To overcome the limitations of polyester compositions, polyester fibers are often blended with other kinds of fibers, both synthetic and natural. Perhaps most widely used in clothing are blended yarns and fabrics made of polyester and cotton. In general, blended fabrics of polyester and cotton are formed by spinning blended yarn from cotton fibers and polyester staple fibers. The blended yarns can then be woven or knitted into fabrics.

Cotton, like polyester, has certain advantages and disadvantages. Cotton is formed almost entirely of pure cellulose. Cotton fibers are typically about one inch long, but can vary from about one half inch to more than two inches. Mature cotton fibers are characterized by their convolutions. Under a microscope, cotton appears as a twisted ribbon with thickened edges. Cotton is lightweight, absorbs moisture quickly and easily, and has a generally favorable texture (i.e., hand) when woven into fabrics. Cotton, however, lacks strength characteristics and elastic memory. Consequently, garments formed entirely of cotton require frequent laundering and pressing.

Blends of cotton and polyester fibers have found wide-ranging acceptance as they combine the desirable characteristics of each. Even so, there are continuing efforts to develop polyester filament, yarns, and fabrics that more closely resemble those of cotton, silk, rayon, or other natural fibers. One example is polyester microfibers, which are characterized by extremely fine filaments that offer exceptionally good aesthetics and hand, while retaining the benefits of polyester.

A need continues to exist, however, for enhanced polyester compositions that have properties similar to those of cotton and other natural fibers, while retaining the advantages of polyester. One such composition and method for producing the same is disclosed by Nichols and Humelsine in pending U.S. patent application Ser. No. 09/141,665 (Polyester Modified with Polyethylene Glycol and Pentaerythritol), which is commonly assigned with this application. U.S. patent application Ser. No. 09/141,665, which is incorporated entirely herein by reference, discloses a polyester composition that includes polyethylene terephthalate, polyethylene glycol in an amount sufficient to increase the wetting and wicking properties of a filament made from the composition to a level substantially similar to the properties of cotton, but less than the amount that would reduce the favorable elastic memory properties of the polyester composition, and chain branching agent in an amount that raises the melt viscosity of the polyester composition to a level that permits filament manufacture under substantially normal spinning conditions. Including significant concentrations of branching agents to increase melt viscosity, however, is sometimes undesirable because branching agents promote cross-linking. This reduces filament strength, which can lead to processing failures.

OBJECT AND SUMMARY OF THE INVENTION

Therefore, it is an object of this invention to provide polyethylene glycol modified polyester filaments that possess favorable characteristics similar to natural fibers, yet retain the advantages of polyester. It is a further object of the present invention to provide a method of copolymerizing polyethylene glycol (PEG) into polyethylene terephthalate (PET) to achieve a PEG-modified polyester composition that is readily spun into filaments, wherein the presence of branching agents is nonessential.

As is understood by those of ordinary skill in the art, modifying conventional polyesters with polyethylene glycol can improve certain polyester characteristics, yet can adversely affect others. For example, adding polyethylene glycol to polyethylene terephthalate improves wetting and wicking, but slows melt-phase polymerization kinetics. It also depresses melt viscosity and renders the processing of such PEG-modified polyesters somewhat impractical in commercial polyester spinning operations.

Accordingly, in one aspect, the invention is a method of copolymerizing polyethylene glycol into polyethylene terephthalate in a way that retains the favorable properties of polyethylene glycol while attaining a high intrinsic viscosity. This facilitates the commercial spinning of the PEG-modified polyester using conventional spinning equipment. As will be understood by those having ordinary skill in the art, copolymerizing polyethylene glycol into polyethylene terephthalate is conventionally achieved by reacting ethylene glycol and either terephthalic acid or dimethyl terephthalate in the presence of polyethylene glycol.

In brief, polyethylene glycol, which typically makes up between about 4 percent and 20 percent by weight of the resulting copolyester, is copolymerized into polyethylene terephthalate in the melt-phase to a relatively low intrinsic viscosity (i.e., a viscosity that will not support filament spinning). The resulting PEG-modified polyester is then further polymerized in the solid phase until the copolyester is capable of achieving a melt viscosity sufficient to spin filaments. Although polyesters having lower intrinsic viscosities can be spun by employing lower temperatures, this is often impractical using conventional spinning equipment.

By introducing a solid state polymerization (SSP) step, the invention reduces the need to add branching agents, such as pentaerythritol, to increase the melt-phase polymerization rate and thereby achieve an intrinsic viscosity that facilitates the spinning of filaments. Although effective at increasing polymer viscosity, branching agents promote cross-linking. Cross-linking leads to relatively weaker textiles. In contrast, the present method achieves a copolyester that contains a significant proportion of polyethylene glycol without relying on branching agents to achieve a melt viscosity that is suitable for spinning filaments.

In another aspect, the invention is a method of spinning the modified polyester composition to form partially oriented yarns (POY). The resulting copolyester POY is particularly suitable for yarns and fabrics, either alone or in a blend with one or more other kinds of fibers. In yet another aspect, the invention is a method of spinning the modified polyester composition to form staple filaments, which can be drawn (and perhaps crimped), and cut into staple fiber. Staple fiber, in turn, can be formed into polyester yarns by employing conventional spinning techniques. In addition, textured and spun yarns can then be formed into fabrics, preferably by knitting or weaving, either alone or in a blend with one or more other kinds of fibers.

The foregoing, as well as other objectives and advantages of the invention and the manner in which the same are accomplished, is further specified within the following detailed description and its accompanying drawings.

DETAILED DESCRIPTION

Figure 1:
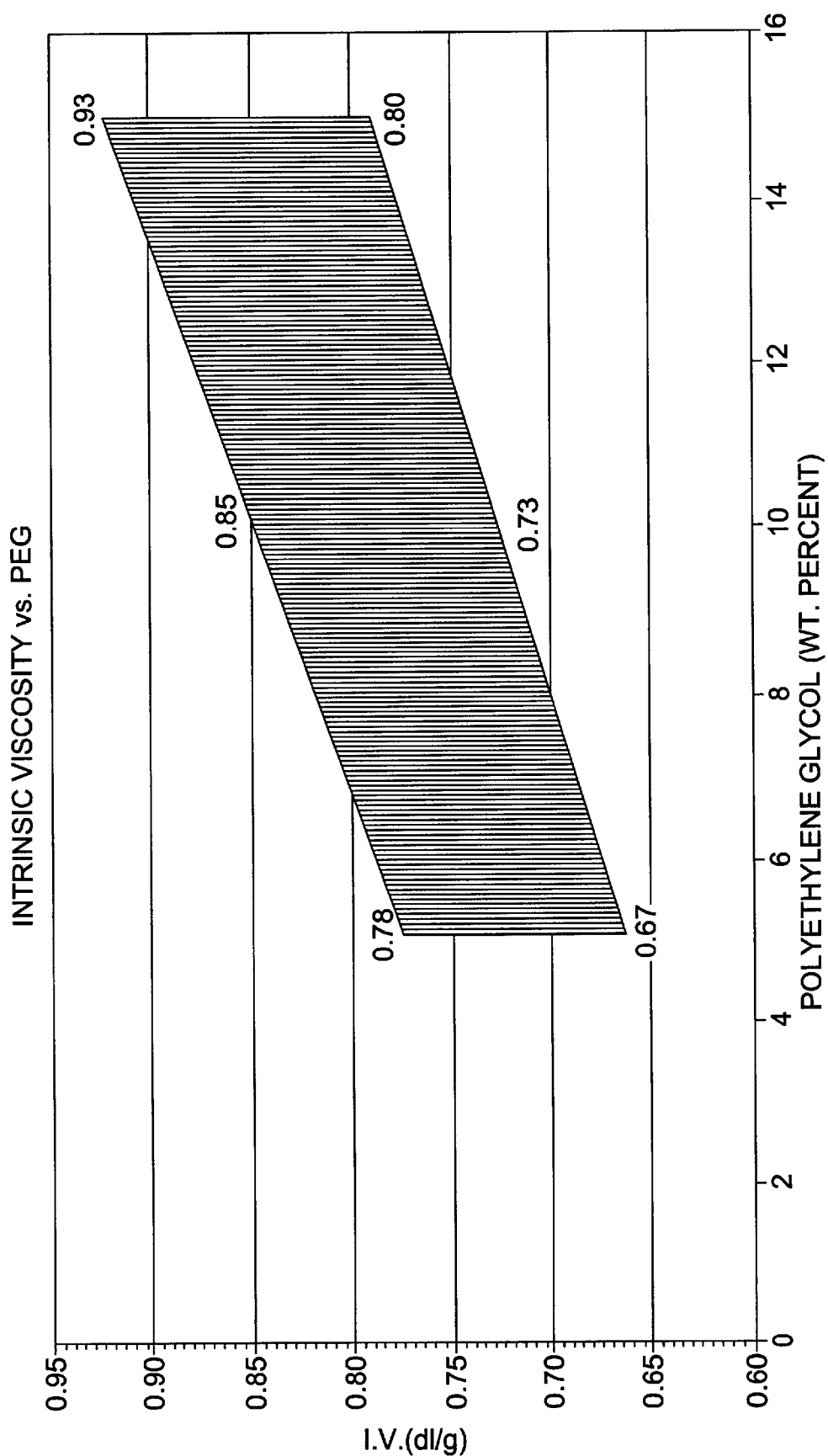
FIG. 1 describes the post-SSP intrinsic viscosity of PEG-modified copolyester versus the weight fraction of polyethylene glycol when branching agent is employed in an amount of less than about 0.0014 mole-equivalent branches per mole of standardized polymer.

In its broadest aspect, the present invention is a method of preparing PEG-modified copolyester filaments by copolymerizing polyethylene glycol into polyethylene terephthalate in the melt phase to form a copolyester composition, then polymerizing the copolyester composition in the solid phase until the copolyester is capable of achieving a melt viscosity that facilitates the spinning of filaments, and thereafter spinning filaments from the copolyester.

In another aspect, the method of preparing PEG-modified copolyester filaments includes copolymerizing polyethylene glycol and chain branching agent into polyethylene terephthalate in the melt phase to form a copolyester composition. The polyethylene terephthalate is present in the copolyester composition in an amount sufficient for a filament made from the copolyester composition to possess dimensional stability properties substantially similar to those of conventional polyethylene terephthalate filaments. The polyethylene glycol, which has an average molecular weight less than about 5000 g/mol, is present in an amount sufficient for a filament made from the copolyester composition to possess wicking, drying, and static-dissipation properties that are superior to those of conventional polyethylene terephthalate filaments. If used, the total amount of chain branching agent is present in the copolyester composition in an amount of less than about 0.0014 mole-equivalent branches per mole of standardized polymer. (As discussed herein, to describe the molar fraction of branching agent consistently, mole-equivalent branches are referenced to unmodified polyethylene terephthalate.) The resulting copolyester composition is further polymerized in the solid phase until the copolyester is capable of achieving a melt viscosity that facilitates the spinning of filaments. Finally, filaments are spun from the copolyester.

The terms "melt viscosity" and "intrinsic viscosity" are used herein in their conventional sense. Melt viscosity represents the resistance of molten polymer to shear deformation or flow as measured at specified conditions. Melt viscosity is primarily a factor of intrinsic viscosity, shear, and temperature. As used herein, the term "melt viscosity" refers to "zero-shear melt viscosity" unless indicated otherwise.

Intrinsic viscosity is the ratio of the specific viscosity of a polymer solution of known concentration to the concentration of solute, extrapolated to zero concentration. Intrinsic viscosity is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996). As used herein, average molecular weight refers to number-average molecular weight, rather than weight-average molecular weight.

Both melt viscosity and intrinsic viscosity, which are widely recognized as standard measurements of polymer characteristics, can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0–63.5 grams) of orthochlorophenol at a temperature of about 105° C. Fiber and yarn samples are typically cut into small pieces, whereas chip samples are ground. After cooling to room temperature, the solution is placed in the viscometer and the relative viscosity is measured. As noted, intrinsic viscosity is calculated from relative viscosity.

In accordance with the invention, copolyester characteristics can be tailored for specific applications by altering the polyethylene glycol content. This permits choice in designing fabrics made with copolyester or copolyester blends according to the present invention. In this sense, the invention establishes a technology family. For example, the weight fraction and the molecular weight of the polyethylene glycol can be adjusted to produce specific effects, such as wetting, drying, dye rates, and softness. Similarly, such modifications can improve the dye strike rate and reduce the dye usage. In particular, higher polyethylene glycol fractions, (e.g., greater than about 4 weight percent), result in softer fabrics that wick faster, dry quicker, and dye darker.

In preferred embodiments, the polyethylene glycol is present in the copolyester composition in an amount between about 4 weight percent and 20 weight percent. When amounts of polyethylene glycol greater than about 20 weight percent are present, the resulting copolyester does not polymerize efficiently. Moreover, at such elevated polyethylene glycol fractions, the copolyester composition is difficult to store and transport for it tends to crystallize, causing undesirable sticking and clumping. Consequently, polyethylene glycol amounts between about 8 weight percent and 14 weight percent are more preferred, and amounts between about 10 weight percent and 12 weight percent are most preferred. Furthermore, while polyethylene glycol with molecular weights between about 200 and 5000 g/mol may be effectively employed, the preferred average molecular weight for polyethylene glycol is between about 300 and 1000 g/mol, most preferably 400 g/mol.

As known to those familiar with the manufacture of polyester, the equipment used to spin polyester into filaments is designed, built, and adjusted to process polymers whose melt viscosity falls within a certain range, typically between about 1500 and 4000 poise. Thus, such equipment runs most satisfactorily when the melt viscosity of the copolyester, which is directly proportional to the intrinsic viscosity as discussed herein, is within this viscosity range. If polyethylene glycol is included in relatively significant amounts (i.e., more than about 4 weight percent), a number of spinning failures are likely to occur when conventional polymerization methods are followed. In other words, high polyethylene glycol fractions can suppress melt viscosity, which in turn can hinder spinning productivity.

The present invention provides a method for incorporating into polyester the favorable properties of polyethylene glycol, particularly its outstanding wetting and wicking properties. The invention accomplishes this by employing a higher intrinsic viscosity to compensate for the tendency of higher fractions of polyethylene glycol to lower the melt viscosity of the copolyester. Consequently, the present method virtually eliminates the need for significant amounts of branching agent. As will be understood by those of skill in the art, a low melt viscosity hinders the processing of copolyester through conventional spinning equipment.

Initially, polyethylene glycol is polymerized into polyethylene terephthalate in the melt phase to form a copolyester composition. Except for its premature termination, the melt polymerization otherwise follows conventional techniques that are well known in the art. This melt polymerization of the copolyester composition, however, is followed by a solid state polymerization step. Conventional wisdom has held that an SSP step is unnecessary and even undesirable with respect to forming copolyester filaments.

In particular, the copolyester composition is polymerized in the solid phase until the copolyester is capable of achieving a zero-shear melt viscosity of at least about 2000 poise at 260° C. It will be understood by those having ordinary skill in the art that, as used herein, the description of polymerizing the copolyester composition in the solid phase until the copolyester is capable of achieving a certain melt viscosity simply means that the solid copolyester would have that particular melt viscosity if it were melted without further solid state polymerization.

In a preferred embodiment of the method, when the weight fraction of polyethylene glycol in the copolyester composition is between about 10 percent and 12 percent, the copolyester composition is polymerized in the solid phase until the copolyester is capable of achieving a melt viscosity of between about 2500 and 3000 poise at a temperature of 260° C. As will be understood by those having ordinary skill in this art, the copolyester need not be spun immediately after undergoing solid state polymerization. In fact, in preferred embodiments, the copolyester is formed into chips after the step of copolymerizing polyethylene glycol into polyethylene terephthalate in the melt phase and before the step of polymerizing the copolyester composition in the solid phase.

According to the present method, copolyester filaments are preferably spun at a temperature between about 260° C. and 300° C. This temperature range comports with that employed in conventional spinning equipment that uses Dowtherm A vapor heat transfer media, which is available from Dow Chemical Co.

As discussed previously, in its broadest aspects, the method includes forming polyethylene glycol modified copolyester filaments by copolymerizing polyethylene glycol into polyethylene terephthalate in the melt phase to form a copolyester composition, then polymerizing the copolyester composition in the solid phase until the copolyester composition is capable of achieving a melt viscosity that facilitates the spinning of filaments, and thereafter spinning filaments from the copolyester. FIG. 1 defines the preferred intrinsic viscosity of the copolyester after solid state polymerization as a function of the weight fraction of polyethylene glycol when low levels of branching agent are employed (e.g., less than 500 ppm of pentaerythritol).

In preferred embodiments, polyethylene glycol is copolymerized into polyethylene terephthalate in the melt phase to an intrinsic viscosity of less than about 0.65 dl/g. In one preferred embodiment, the melt phase copolymerization is terminated before the copolyester composition reaches an intrinsic viscosity of about 0.60 dl/g. In another preferred embodiment, the melt phase copolymerization is terminated before the copolyester composition reaches an intrinsic viscosity of about 0.55 dl/g.

As will be understood by those having ordinary skill in the art, modified polyethylene terephthalate having an intrinsic viscosity of less than 0.65 dl/g, more than about 4 weight percent polyethylene glycol, and low levels of branching agent is not readily spun into filaments. Consequently, after the melt polymerization step, the PEG-modified copolyester composition is polymerized in the solid phase to an intrinsic viscosity greater than the intrinsic viscosity achieved via the melt polymerization. For example, when the weight fraction of polyethylene glycol in the copolyester composition is about 5 percent, the copolyester composition is preferably polymerized in the solid phase to an intrinsic viscosity of between about 0.67 and 0.78 dl/g. Similarly, when the weight fraction of polyethylene glycol in the copolyester composition is about 10 percent, the copolyester composition is preferably polymerized in the solid phase to an intrinsic viscosity of between about 0.73 and 0.85 dl/g. Finally, when the weight fraction of polyethylene glycol in the copolyester composition is about 15 percent, the copolyester composition is preferably polymerized in the solid phase to an intrinsic viscosity of between about 0.80 and 0.93 dl/g. More generally, the target intrinsic viscosity for any polyethylene glycol weight fraction between about 5 percent and 15 percent is defined by the shaded region in FIG. 1.

It will be understood to those of skill in the art that the polyethylene glycol reduces melt temperature ($T_m$) and glass transition temperature ($T_g$). Consequently, the temperature at which dyes will penetrate the modified polyester structure is lowered. Accordingly, the present method further comprises dyeing the copolyester filaments at a temperature of less than about 240° F. In one preferred embodiment, the method includes dyeing the copolyester filaments at a temperature of less than about 230° F. In yet another preferred embodiment, the method includes dyeing the copolyester filaments at a temperature of less than about 220° F. In fact, the copolyester filaments can be dyed at or below the temperature defined by the boiling point of water at atmospheric pressure (i.e., 212° F. or 100° C.). In fact, the copolyester fibers have achieved excellent color depth when dyed at 200° F.

As used herein, the concept of dyeing copolyester filaments includes dyeing not only filaments (e.g., partially oriented yarn filaments), but also staple fibers cut from filaments. Moreover, this concept further includes dyeing copolyester fibers that are formed into yarns or fabrics, either alone or in blends with one or more other kinds of fiber (e.g., cotton or spandex fibers).

In one particular embodiment, the method of preparing PEG-modified copolyester filaments includes reacting in the melt phase ethylene glycol and either terephthalic acid and dimethyl terephthalate in the presence of polyethylene glycol to form a copolyester composition having an intrinsic viscosity of less than about 0.65 dl/g. Preferably, the weight fraction of polyethylene glycol in the resulting copolyester composition is between about 4 percent and 20 percent. The copolyester composition is thereafter polymerized in the solid phase until the copolyester is capable of achieving a melt viscosity of at least about 2000 poise when heated to 260° C. Finally, filaments are spun from the copolyester. Additionally, the resulting copolyester filaments may be dyed at a temperature of less than about 240° F.

As noted, in one aspect the method of preparing PEG-modified copolyester filaments includes copolymerizing polyethylene glycol and chain branching agent into polyethylene terephthalate in the melt phase to form a copolyester composition. The polyethylene terephthalate is present in an amount sufficient for a filament made from the copolyester composition to possess dimensional stability properties (e.g., shrinkage during home laundering) substantially similar to those of conventional polyethylene terephthalate filaments. The polyethylene glycol, which has an average molecular weight less than about 5000 g/mol, is present in an amount sufficient for filaments made from the copolyester composition to possess wetting, wicking, drying, flame retardancy, and static-dissipation properties that are superior to those of conventional polyethylene terephthalate filaments. It has been further observed that fabrics formed according to the present invention possess significantly improved hand (i.e., tactile qualities) as compared to conventional polyester fabrics made of fibers having similar denier per filament (DPF).

As discussed previously, at least about 4 weight percent polyethylene glycol is necessary to achieve these improved filament characteristics. When used, chain branching agent is present in the copolyester composition in an amount of less than about 0.0014 mole-equivalent branches per mole of standardized polymer. The resulting copolyester composition is further polymerized in the solid phase until the copolyester is capable of achieving a melt viscosity that facilitates the spinning of filaments. Finally, filaments are spun from the copolyester.

Figure 2:
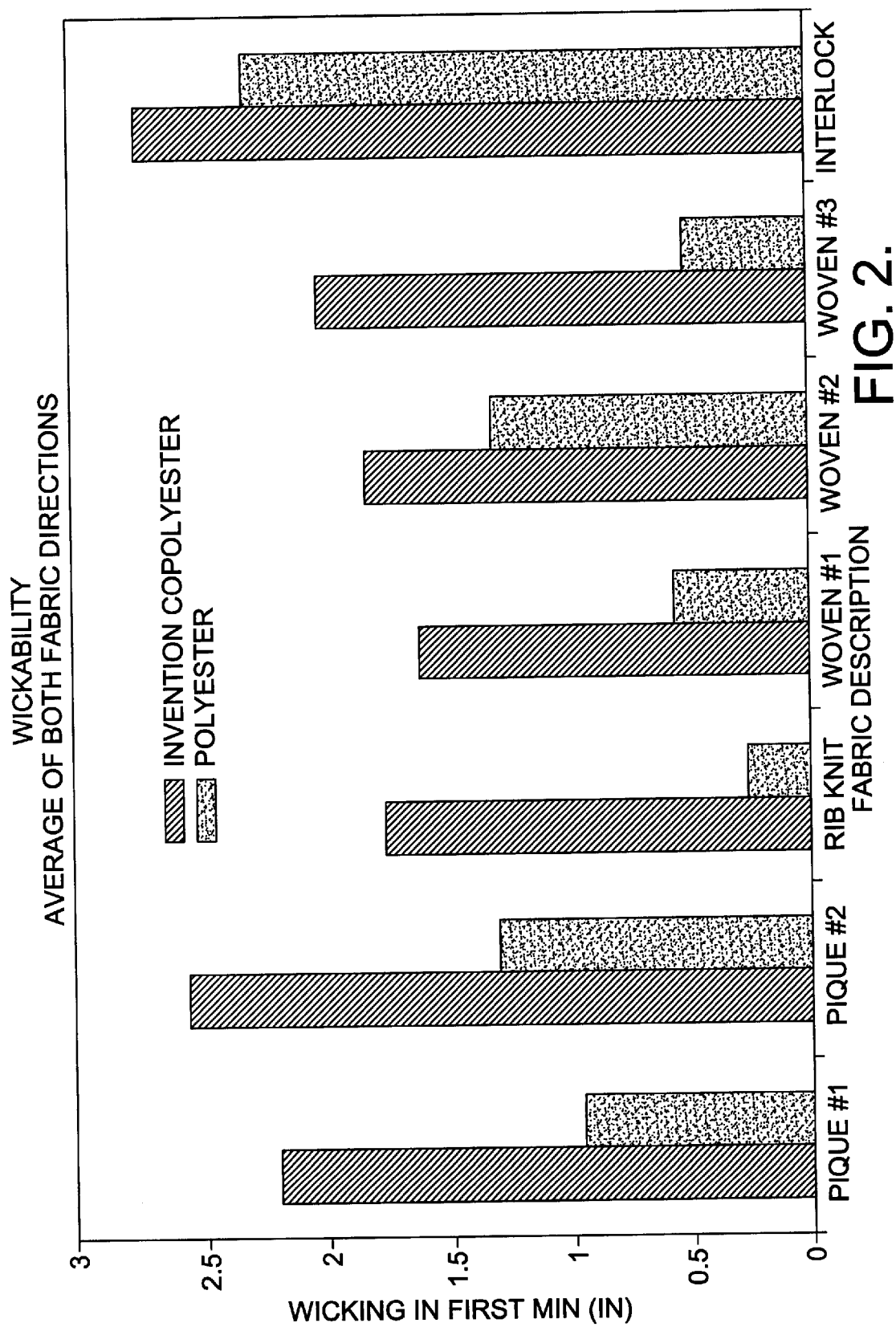
FIG. 2 describes the wicking properties of fabrics formed from copolyester filaments produced according to the invention as compared to the wicking properties of fabrics formed from conventional, unmodified polyethylene terephthalate filaments.

FIG. 2 describes the wicking properties of fabrics formed from copolyester filaments produced according to the invention as compared to the wicking properties of fabrics formed from conventional, unmodified polyethylene terephthalate filaments. Wicking properties were measured using 1"×7" strips that were suspended vertically above water-filled beakers and then submersed one inch below the water surface. After one minute, the water migration up the test strips was measured. The fabrics were tested in both fabric directions and averaged. The test strip fabrics were laundered once before testing. The room conditions were ASTM standard 21° C. and 65 percent relative humidity.

Figure 3:
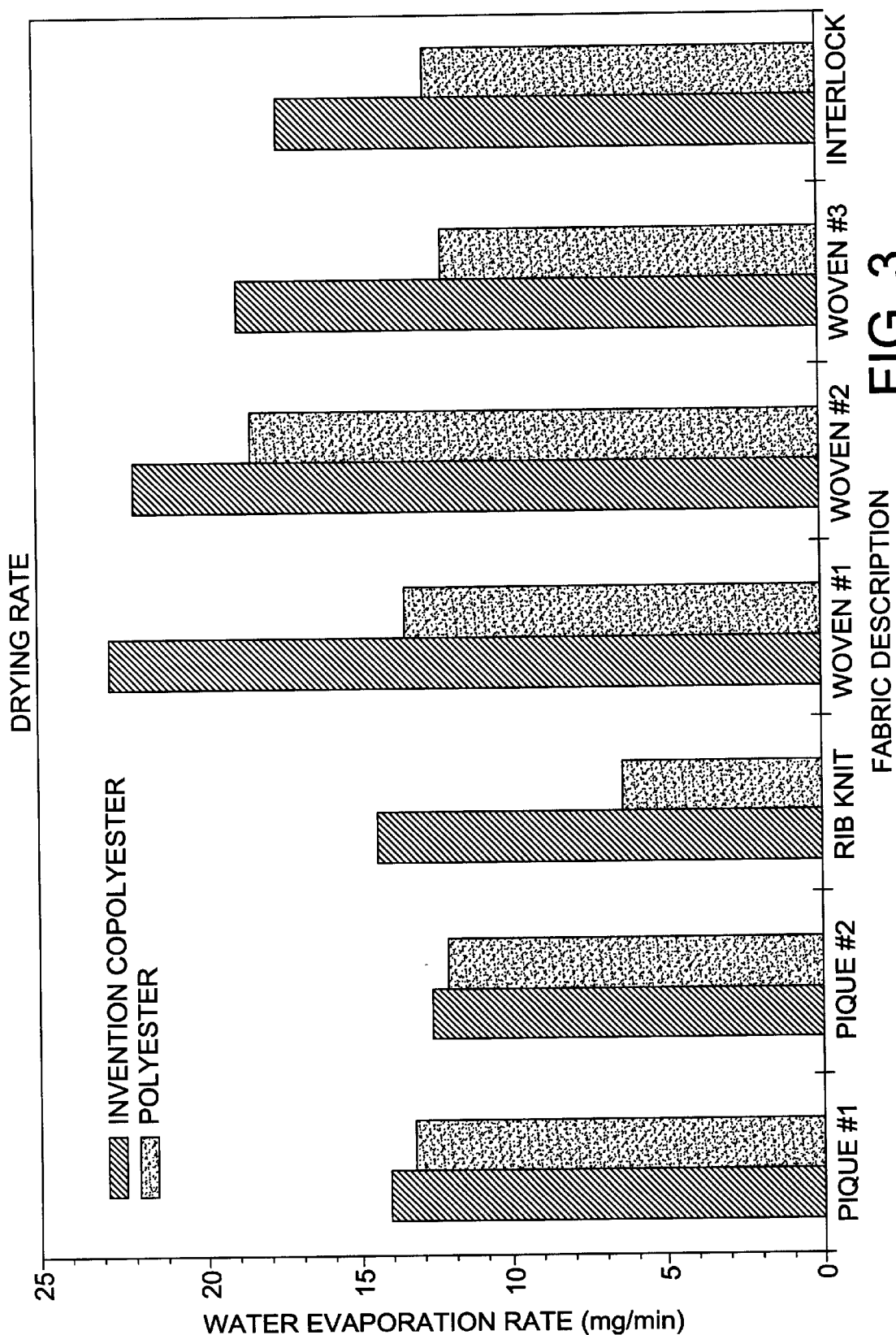
FIG. 3 describes the drying properties of fabrics formed from copolyester filaments produced according to the present invention as compared to the drying properties of fabrics formed from conventional, unmodified polyethylene terephthalate filaments.

FIG. 3 describes the drying properties of fabrics formed from copolyester filaments produced according to the present invention as compared to the drying properties of fabrics formed from conventional, unmodified polyethylene terephthalate filaments. Drying rate was determined using a Sartorius MA30-000V3 at 40° C. Two or three drops of water were placed on the fabrics. Then, the evaporation time was measured and an evaporation rate was calculated. The room conditions were ASTM standard 21° C. and 65 percent relative humidity.

Figure 4:
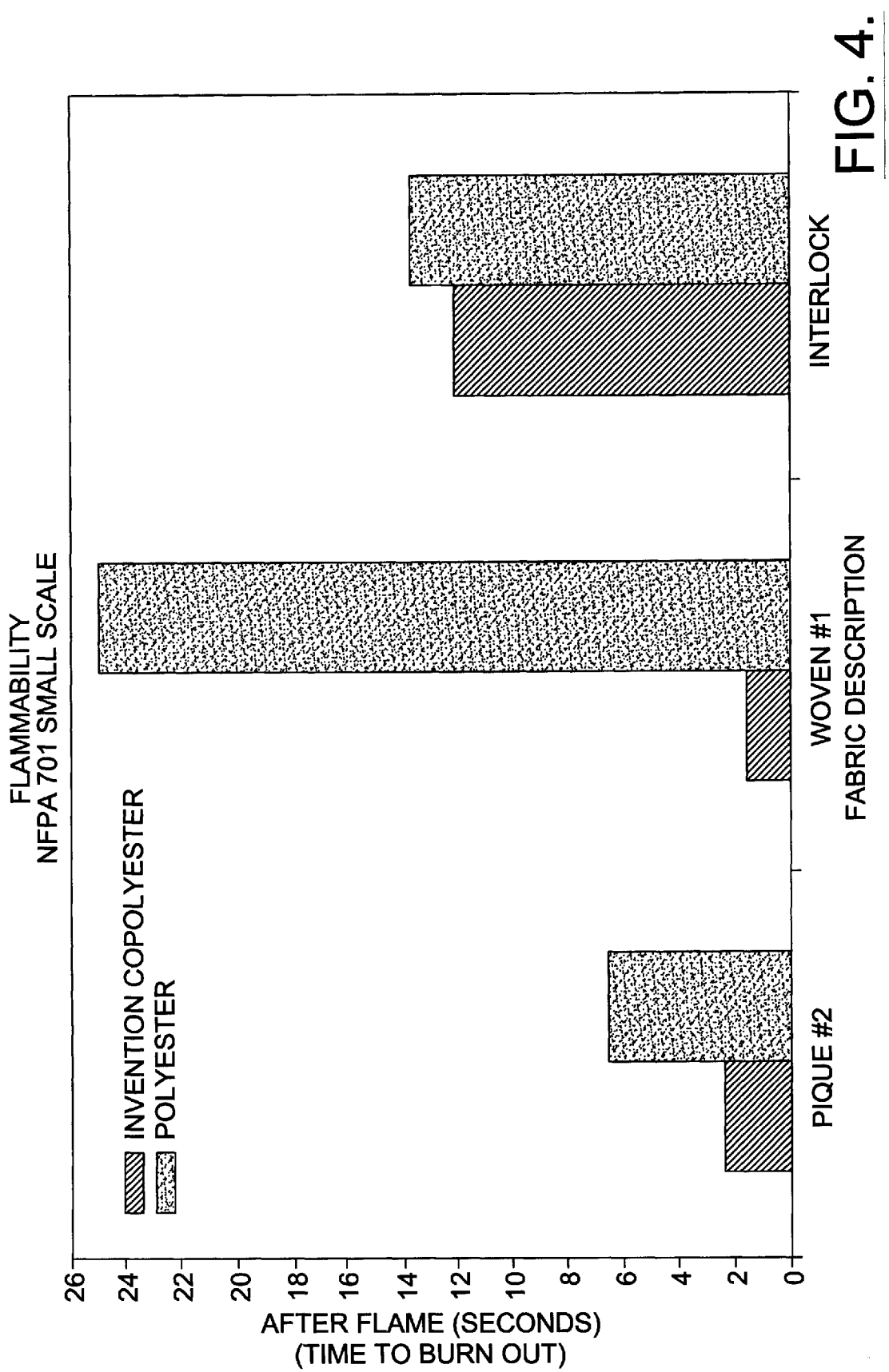
FIG. 4 describes the flame-retardancy properties of fabrics formed from copolyester filaments produced according to the invention as compared to the flame-retardancy properties of fabrics formed from conventional, unmodified polyethylene terephthalate filaments.

FIG. 4 describes the flame-retardancy properties of fabrics formed from copolyester filaments produced according to the invention as compared to the flame-retardancy properties of fabrics formed from conventional, unmodified polyethylene terephthalate filaments. The testing was performed in accordance with the NFPA 701 Method small-scale-after-flame test. FIG. 4 merely shows that fabrics formed from copolyester filaments produced according to the invention have better flame-retardancy properties as compared to those of fabrics formed from conventional, unmodified polyethylene terephthalate filaments. FIG. 4 is not intended to imply that fabrics formed from copolyester filaments produced according to the invention will meet any particular government flammability standards.

Figure 5:
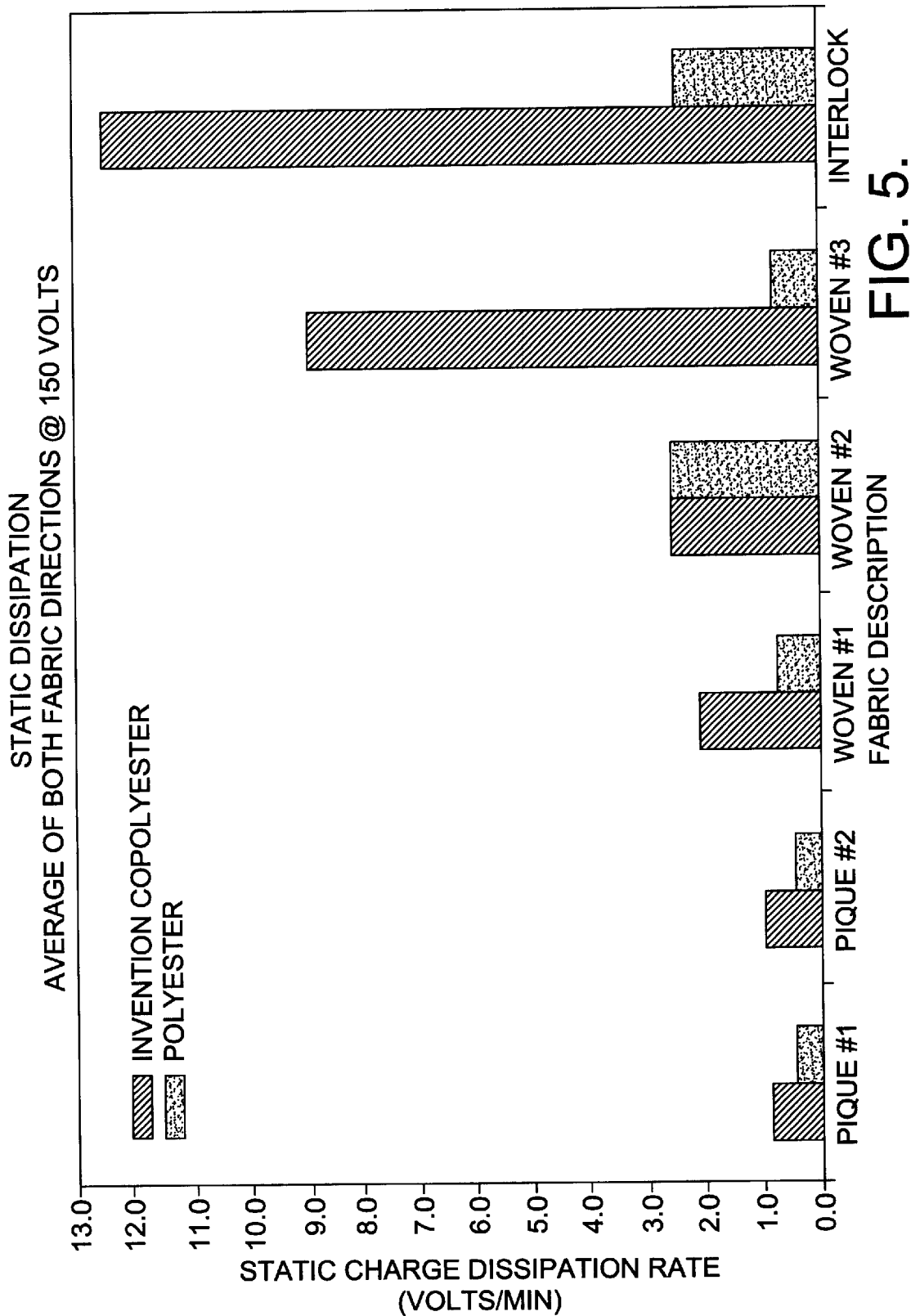
FIG. 5 describes the static-dissipation properties of fabrics formed from copolyester filaments produced according to the invention as compared to the static-dissipation properties of fabrics formed from conventional, unmodified polyethylene terephthalate filaments.

FIG. 5 describes the static-dissipation properties of fabrics formed from copolyester filaments produced according to the invention as compared to the static-dissipation properties of fabrics formed from conventional, unmodified polyethylene terephthalate filaments. Static dissipation was determined using a Rothschild Static-Voltmeter R-4021. In brief, fabric was mounted between the electrodes, and then the time for the voltage across the fabric to reduce from 150 volts to 75 volts was measured. The room conditions were ASTM standard 21° C. and 65 percent relative humidity. As will be understood by those having ordinary skill in the art, a shorter charge half-life is desirable in fabrics because it means fabric static is dissipated faster.

Figure 6:
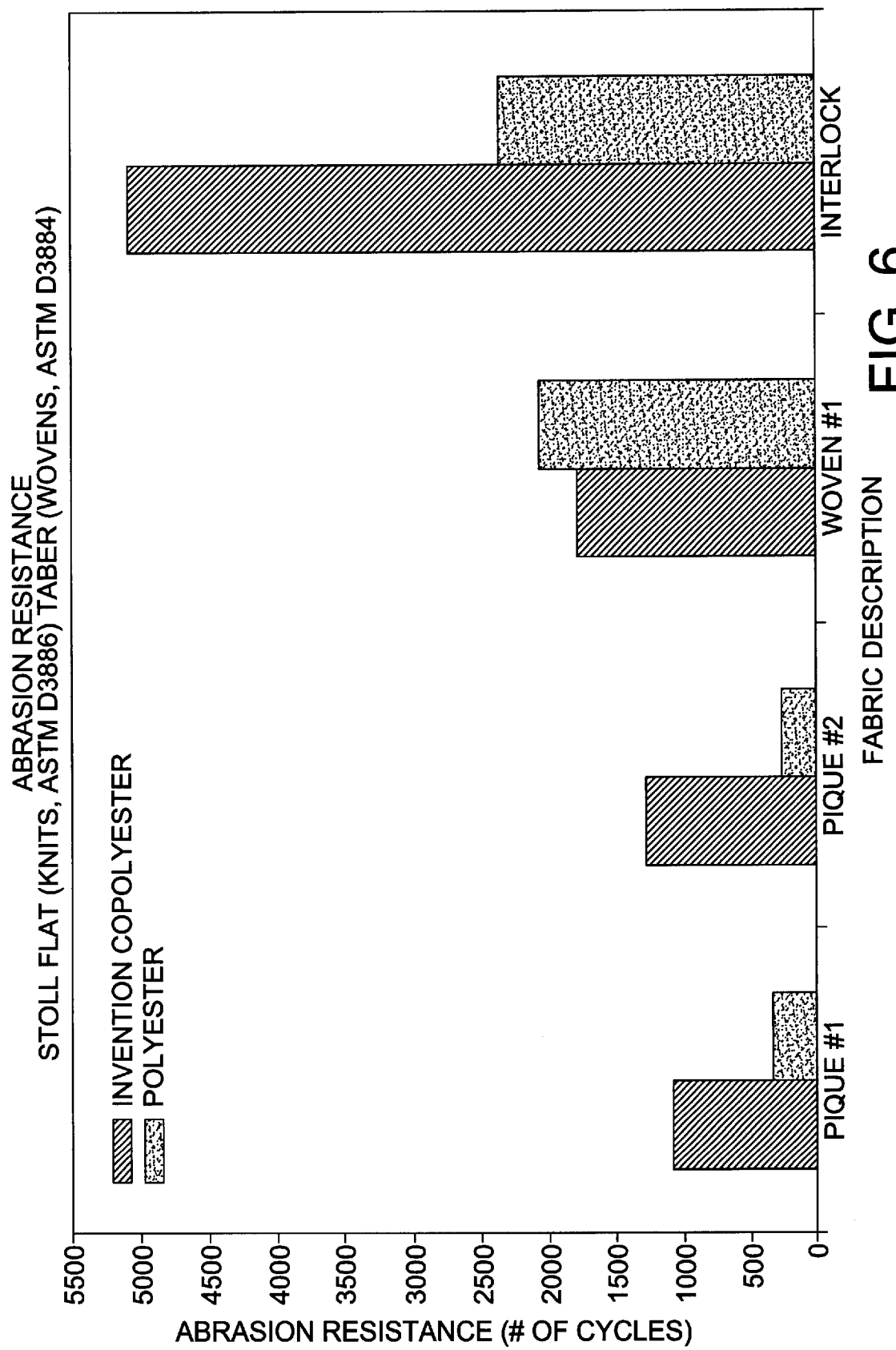
FIG. 6 describes the abrasion resistance properties of fabrics formed from copolyester filaments produced according to the invention as compared to the abrasion resistance properties of fabrics formed from conventional, unmodified polyethylene terephthalate filaments.

FIG. 6 describes the abrasion resistance properties of fabrics formed from copolyester filaments produced according to the invention as compared to the abrasion resistance properties of fabrics formed from conventional, unmodified polyethylene terephthalate filaments. The fabrics each had a $TiO_2$ level of 3000 ppm. Abrasion resistance was determined using Stoll flat (knits) ASTM D 3886 method and Taber (wovens) ASTM D 3884 method.

Figure 7:
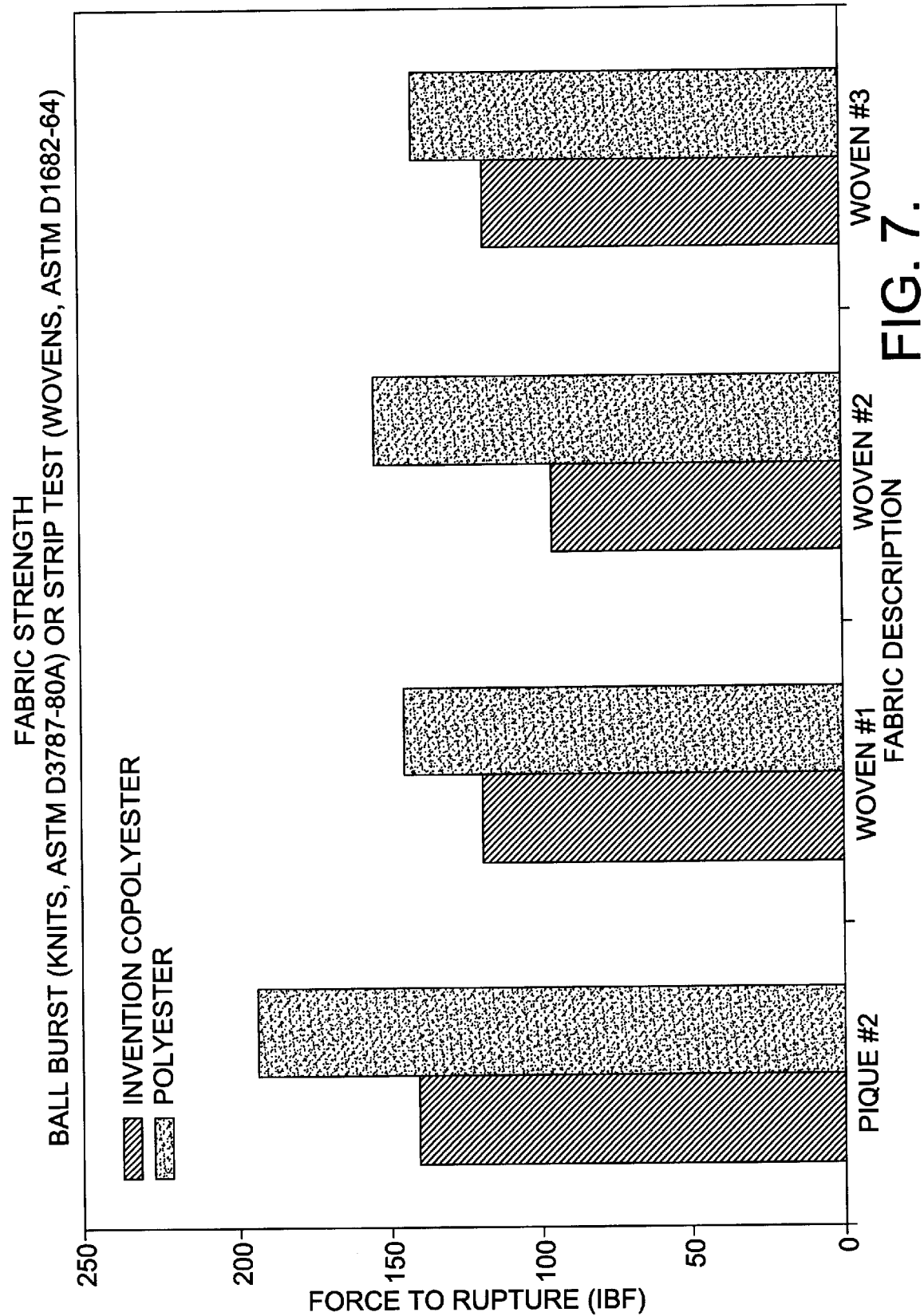
FIG. 7 describes the strength properties of fabrics woven from copolyester filaments produced according to the present invention as compared to the strength properties of fabrics woven from conventional, unmodified polyethylene terephthalate filaments.

FIG. 7 describes the strength properties of fabrics woven from copolyester filaments produced according to the present invention as compared to the strength properties of fabrics woven from conventional, unmodified polyethylene terephthalate filaments. The somewhat weaker strength of fabrics formed from the filaments prepared according to the invention reduces undesirable pilling. Fabric strength was determined by strip test (wovens) ASTM D 1682-64 method or by Ball Burst (knits) ASTM D3787-80A.

Figure 8:
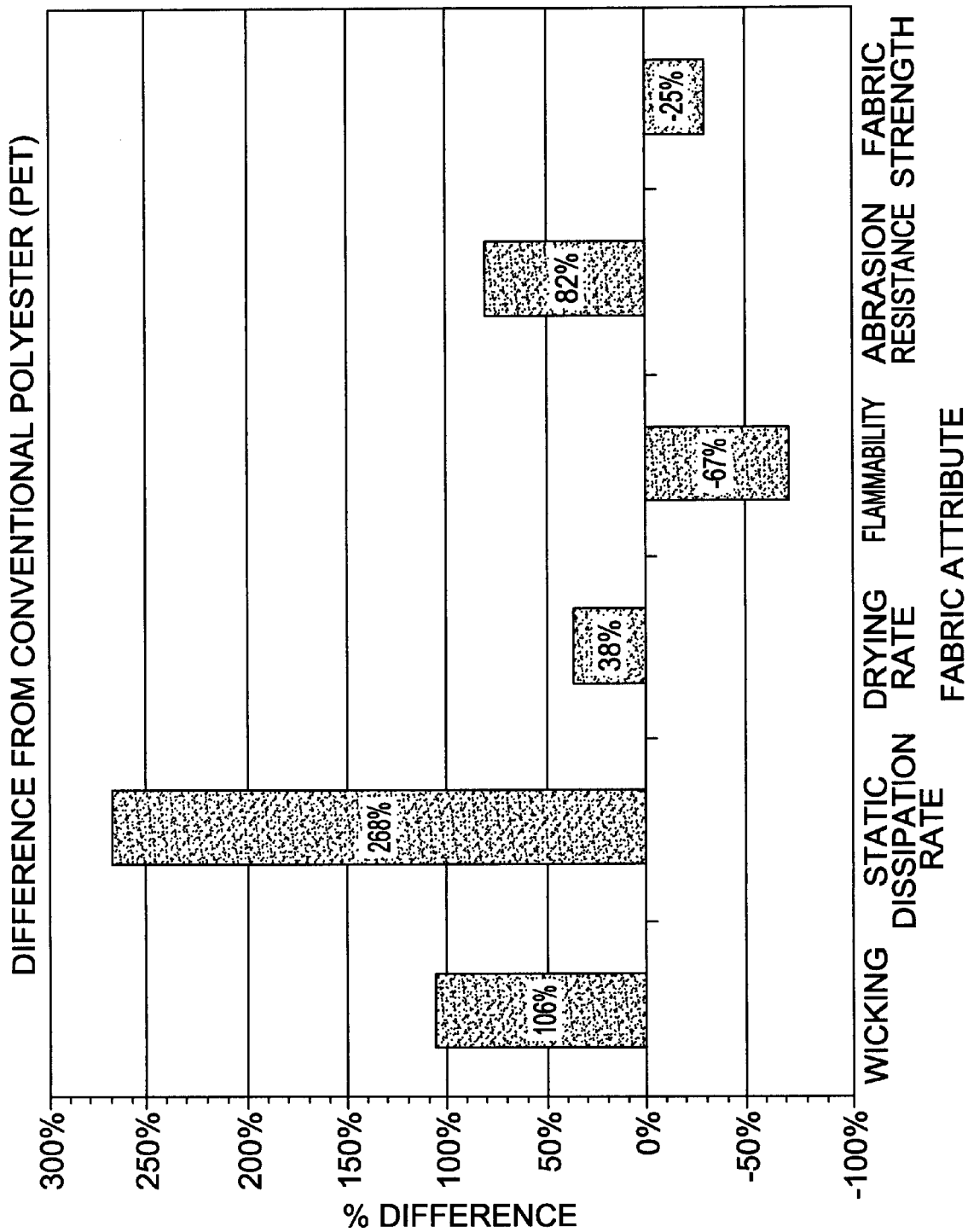
FIG. 8 describes the improved properties of fabrics formed from copolyester filaments produced according to the invention as compared to the properties of fabrics formed from conventional, unmodified polyethylene terephthalate filaments.

FIG. 8 summarizes on a percentage basis the improved properties of fabrics formed from copolyester filaments produced according to the invention as compared to the properties of fabrics formed from conventional, unmodified polyethylene terephthalate filaments.

Preparing PEG-modified copolyester filaments according to the invention not only yields certain improved textile characteristics, but also retains the desirable dimensional stability of ordinary polyester. Despite the significant concentration of polyethylene glycol, copolyester filaments prepared according to the invention have dimensional stability properties, especially shrinkage during home laundering, that are substantially similar to those of conventional polyethylene terephthalate filaments. For example, conventional polyester fabric exhibits less than about five percent shrinkage in home laundering if finished at a fabric temperature at or above 350° F. Similarly, copolyester fabric of the invention exhibits less than about five percent shrinkage in home laundering if finished at a fabric temperature at or above only 330° F.

It is also expected that fabrics formed from the filaments spun according to the invention will possess better elastic-memory properties (i.e., stretch and recovery) as compared to fabrics formed from conventional polyethylene terephthalate filaments.

The commonly-assigned patent application Ser. No. 09/141,665 discloses that chain branching agents can raise the melt viscosity of PEG-modified copolymer melt to within the range of normal, unmodified polyethylene terephthalate. In contrast, the present invention introduces an alternative method of producing filament from PEG-modified copolyester without resorting to significant fractions of branching agent.

In accordance with this aspect of the invention, the total amount of chain branching agent in the copolyester is insufficient to raise the melt viscosity of the copolyester composition to a level that would permit the manufacture of copolyester filament under conditions (e.g., spinning temperature) that are substantially the same as those under which filament can be formed from unmodified polyethylene terephthalate. More specifically, chain branching agent is present in the copolyester composition in an amount of less than about 0.0014 mole-equivalent branches per mole of standardized polymer.

As used herein, the term "mole-equivalent branches" refers to the reactive sites available for chain branching on a molar basis (i.e., the number of reactive sites in excess of the two required to form a linear molecule). For example, pentaerythritol is a tetrafunctional branching agent, so it possesses two available chain branching reactive sites.

In addition, as used herein, the term "standardized polymer" refers to the repeat unit of unmodified polyethylene terephthalate, which has a molecular weight of 192 g/mol. In this regard, it will be understood by those of skill in the art that, for a given total weight of polyethylene terephthalate, polyethylene glycol, and branching agent, increasing the relative weight fraction of polyethylene glycol, which preferably has a molecular weight of between about 200 g/mol and 5000 g/mol, will decrease total moles. (This is so because the molecular weight of polyethylene terephthalate is less than the molecular weight of the polyethylene glycol.) Consequently, to maintain uniformity across various concentrations and molecular weights of polyethylene glycol, the chain branching agent concentration of preferably less than about 0.0014 mole-equivalent branches per mole of standardized polymer is based on the repeat unit of unmodified polyethylene terephthalate. In other words, the weight fraction of branching agent should be calculated as if the polymer is made of only unmodified polyethylene terephthalate. Consequently, the weight fraction of polyethylene glycol (e.g., preferably between about 4 weight percent and 20 weight percent) and the molecular weight of the polyethylene glycol (e.g., preferably between about 200 g/mol and 5000 g/mol) can be disregarded in calculating mole-equivalent branches per mole of standardized polymer.

For example, an amount of pentaerythritol less than about 0.0014 mole-equivalent branches per mole of the copolyester composition is equivalent to a weight fraction of less than about 500 ppm when based on the standardized polymer of unmodified polyethylene terephthalate, whose repeat unit has a molecular weight of about 192 g/mol. To further illustrate this relationship, assume 1000 grams of starting materials—500 ppm pentaerythritol, which has a molecular weight of 136.15 g/mol, and the remainder polyethylene terephthalate. This is equivalent to 0.5 gram pentaerythritol, or 0.00367 moles of pentaerythritol, and 999.5 grams polyethylene terephthalate, or 5.21 moles polyethylene terephthalate repeat units. The mole fraction of pentaerythritol relative to the polyethylene terephthalate is, therefore, 0.0705 mole percent (i.e., 0.00367 moles of pentaerythritol ÷5.21 moles polyethylene terephthalate). As noted, pentaerythritol has two available chain branching reactive sites. Thus, the mole-equivalent branches per mole of unmodified polyethylene terephthalate is 0.14 percent (i.e., 0.0014 mole-equivalent branches per mole of standardized polymer).

The weight fraction corresponding to 0.0014 mole-equivalent branches per mole of standardized polymer can be estimated for any branching agent using the following equation:

$$\text{branching agent (ppm)} = (MEB \div CBRS) \cdot (BAMW \div SPMW) \cdot 10^6,$$

wherein

MEB=0.0014 mole-equivalent branches per mole of standardized polymer

CBRS=number of available chain branching reactive sites
BAMW=molecular weight of the branching agent (g/mol)
SPMW=192 g/mol—molecular weight of the standardized polymer (i.e., unmodified polyethylene terephthalate)

It will be appreciated by those of skill in the chemical arts that if the mole-equivalent branches were not referenced to a mole of standardized polymer, a branching agent concentration of 0.0014 mole-equivalent branches per mole of polymer (i.e., the copolyester composition) would translate to a slightly lower weight fraction, (i.e., ppm), when a greater polyethylene glycol weight fraction is used, or when polyethylene glycol having a higher average molecular weight is employed. For example, if mole-equivalent branches per mole of polymer were not related to a common standard, but rather to the actual components of the copolyester composition, an amount of pentaerythritol less than about 0.0014 mole-equivalent branches per mole of the copolyester composition would be equivalent to a weight fraction of less than about 450 ppm when based on polyethylene terephthalate that is modified by 20 weight percent polyethylene glycol having an average molecular weight of about 400 g/mol. Likewise, an amount of pentaerythritol less than about 0.0014 mole-equivalent branches per mole of the copolyester composition would be equivalent to a weight fraction of less than about 400 ppm when based on polyethylene terephthalate that is modified by 20 weight percent polyethylene glycol having an average molecular weight of about 5000 g/mol. By employing unmodified polyethylene terephthalate as the standardized polymer, however, an amount of pentaerythritol less than about 0.0014 mole-equivalent branches per mole of standardized polymer is equivalent to a weight fraction of less than about 500 ppm regardless of the weight fraction or molecular weight of the polyethylene glycol.

To the extent a chain branching agent is employed, the chain branching agent is preferably a trifunctional or tetrafunctional alcohol or acid that will copolymerize with polyethylene terephthalate. As will be understood by those skilled in the art, a trifunctional branching agent has one reactive site available for branching and a tetrafunctional branching agent has two reactive sites available for branching. Acceptable chain branching agents include, but are not limited to, trimesic acid ($C_6H3(COOH)_3$), pyromellitic acid ($C_6H_2(COOH)4$), pyromellitic dianhydride, trimellitic acid, trimellitic anhydride, trimethylol propane ($C_2H_5C(CH_2OH)_3$), and preferably pentaerythritol ($C(CH_2OH)_4$), If the total number of reactive sites exceeds four per branching agent molecule, steric hindrance may prevent full polymerization at the available reactive sites such that more branching agent may be required to achieve the desired mole-equivalent branches. See, e.g., U.S. Pat. Nos. 4,092,299 and 4,113,704 by MacLean and Estes.

Accordingly, in one particular embodiment, the method of preparing PEG-modified copolyester filaments includes copolymerizing polyethylene glycol and chain branching agent into polyethylene terephthalate in the melt phase to form a copolyester composition having an intrinsic viscosity of less than about 0.65 dl/g. As will be understood by those having ordinary skill in the art, copolymerizing polyethylene glycol and branching agent into polyethylene terephthalate is conventionally achieved by reacting ethylene glycol and either terephthalic acid or dimethyl terephthalate in the presence of polyethylene glycol and branching agent.

The polyethylene terephthalate is present in an amount sufficient for a filament made from the copolyester composition to possess elastic memory and dimensional stability properties substantially similar to those of conventional polyethylene terephthalate filaments. The polyethylene glycol, which has an average molecular weight less than about 5000 g/mol, is present in an amount sufficient for a filament made from the copolyester composition to possess wicking, drying, and static-dissipation properties that are superior to those of conventional polyethylene terephthalate filaments. Moreover, the total amount of chain branching agent that is present in the copolyester composition is less than about 0.0014 mole-equivalent branches per mole of standardized polymer.

After the melt polymerization step, the copolyester composition is solid state polymerized until the copolyester is capable of achieving a melt viscosity of at least about 2000 poise when heated to 260° C. Finally, filaments are spun from the copolyester composition. In addition, the resulting copolyester filaments may be dyed at a temperature of less than about 240° F.

In brief, the solid phase polymerization step following the melt polymerization step produces a melt viscosity for the PEG-modified polyester sufficient for practical processing, and sufficient spinning tensions for a stable and high-throughput commercial process. This is so despite the presence of only insignificant amounts of branching agent (i.e., less than about 0.14 percent mole-equivalent branches per mole of standardized polymer).

A distinct advantage of the present method is that it produces a copolyester filament that, while possessing wetting, wicking, drying, soft hand, flame-retardancy, abrasion-resistance, and static-dissipation properties that are superior to those of conventional polyethylene terephthalate filaments, can be processed using conventional textile equipment. For example, in one broad aspect, the PET-modified copolyester can be spun into partially oriented yarns (POY). As will be understood by those having ordinary skill in the art, POY is often comprised of from tens to hundreds of intermingled filaments (e.g., between 30 and 200) that are extruded from a spinneret at speeds typically between about 2000 and 4000 meters per minute. The POY is then typically drawn to form a drawn yarn, (e.g., by draw texturing, flat drawing, or warp drawing). Thereafter, the drawn yarn is formed into fabric, which is typically finished as well. As will be known by those skilled in the art, texturing can be effected in numerous ways, such as air jet, gear crimping, and false-twist techniques.

It should be noted that flat drawn POY produced according to the invention results in yarns having dyeing characteristics similar to those of cellulose acetate yarns. These copolyester yarns are especially suitable for producing suit linings. As will be known to those having ordinary skill in the art, suit linings are conventionally jig dyed using low-energy dyes, which have poor fastness properties. The yarns and fabric formed according to the invention, however, can be dyed on conventional jig dyeing equipment using high-energy dyes, which have better fastness.

Because of the characteristic advantages that the invention brings to the polyester compositions described herein, the resulting polyester filaments are particularly useful in blended yarns and blended fabrics. Accordingly, copolyester POY can be blended with at least one other kind of fiber (i.e., a fiber having a different chemical composition or having been differently processed) to form a blended yarn. As will be understood by those familiar with textile processes, the copolyester POY is typically either draw textured to form a draw textured yarn (DTY) or flat drawn to form a flat-drawn yarn (i.e., a hard yarn) before blending. The drawn copolyester yarn is especially suitable for blending with cotton fibers, rayon fibers, polypropylene fibers, acetate fibers, nylon fibers, spandex fibers, and conventional polyester fibers.

Furthermore, the drawn copolyester yarn (e.g., DTY or hard yarn) can also be blended with a least one other kind of fiber to form blended fabric. In this regard, the drawn copolyester yarn is especially suitable for blending with cotton fibers, rayon fibers, polypropylene fibers, acetate fibers, nylon fibers, spandex fibers, conventional polyester fibers, and even copolyester staple fibers of the present invention. It will be understood that, as used herein, the concept of forming a blended fabric from the drawn copolyester yarn and at least one other kind of fiber not only includes directly forming a fabric from the drawn copolyester yarn and a second kind of fiber, but also includes first forming a blended yarn before forming the blended fabric. In either case, however, the blended fabric is formed from a drawn copolyester yarn and a second kind of fiber.

As will be known to those skilled in the art, two different kinds of filaments are not usually textured together unless they can use the same temperature and draw ratio. Consequently, it is desirable to form a blended fabric without first forming a blended yarn when the second kind of fiber has different texturing requirements than those of the copolyester POY.

It has been observed, however, that the copolyester POY and nylon yarn require similar texturing temperatures. Accordingly, in a preferred embodiment, the copolyester POY and a nylon yarn are formed into a blended yarn. Thereafter, the blended yarn is textured. Interestingly, because of dye selectivity, the resulting blended yarn may be dyed with disperse dye, which preferentially dyes the copolyester component, and acid-based dye, which preferentially dyes the nylon component. In this way, a heather yarn (or a two-colored yarn) can be produced, which may then be formed into an attractive, heather fabric (or a two-colored fabric).

In another broad aspect, the invention further includes cutting the copolyester filaments into staple fibers. As will be understood by those having ordinary skill in the art, perhaps thousands of filaments can be spun from a single spinneret, typically at speeds of between about 500 and 2000 meters per minute. The filaments, often from numerous spinneret positions, are combined into a tow. The tow is often crimped before the filaments are cut into staple fibers.

The staple fibers can be formed into yarn using any conventional spinning technique, such as ring spinning, open-end spinning, and air jet spinning. In this regard, open end and air jet spinning are becoming increasingly more preferred for polyester yarns, as well as for blended yarns containing polyester. The yarns formed from the copolyester filaments of the invention, in turn, can be woven or knitted into fabrics that have the advantageous characteristics referred to herein. Alternatively, the staple fibers can be formed directly into a non-woven fabric. As used herein, the concept of forming staple fibers into fabric includes first forming a yarn, (e.g., knitting and weaving), in addition to forming the staple fibers directly into fabric, (e.g., non-woven fabric).

In another aspect, the method includes blending the staple copolyester fibers with at least a second kind of fiber, such as cotton fibers, rayon fibers, polypropylene fibers, acetate fibers, nylon fibers, spandex fibers, and conventional unmodified polyester fibers. In this regard, acetate fibers and spandex fibers are usually in filament form. Thereafter, the staple fibers and the second kind of fiber can be spun into yarn, and the yarn formed into fabric using conventional techniques. Alternatively, the staple fibers and the second kind of fiber can be formed directly into a non-woven fabric.

In yet another aspect, the invention includes forming copolyester fibers from the copolyester composition, and then blending the copolyester fibers with spandex fibers. As used herein, the term "copolyester fiber" broadly refers to uncut filament (e.g., POY) and cut fiber (e.g., staple fiber).

For example, the copolyester fibers and the spandex fibers can be blended into yarn. In one preferred embodiment, this comprises core spinning copolyester staple fibers around a core of spandex filaments. Likewise, in another preferred embodiment, the copolyester filaments—preferably in the form of POY—are wrapped around spandex filaments.

The copolyester fibers and the spandex fibers may also be formed into fabric using conventional techniques. For example, the fabric may be formed, (e.g., woven or knitted), from a blended yarn that is spun from the copolyester fibers and the spandex fibers. Alternatively, the copolyester fibers and spandex fibers may be directly formed into a fabric, preferably a knit fabric. To accomplish this, the spandex is laid into a copolyester knit by employing an appropriate knitting machine attachment.

As noted previously, the invention can include dyeing the copolyester fibers at a temperature of less than about 240° F. In particular, this reduction in dyeing temperature not only reduces energy usage, but also permits copolyester fibers that are produced according to this embodiment of the invention to be more effectively combined with spandex filaments. Blended yarns and fabrics that are made from PEG-modified copolyester fibers—preferably staple fibers or POY—and spandex fibers can be dyed at temperatures of less than about 240° F., and yet can achieve excellent fastness and depth of color. In one preferred embodiment, the spandex fibers and the copolyester fibers may be dyed at a temperature of less than about 230° F. In another preferred embodiment, the spandex fibers and the copolyester fibers may be dyed at a temperature of less than about 220° F. In yet another preferred embodiment, the spandex fibers and the copolyester fibers may be dyed at or below a temperature of less than the boiling point of water at atmospheric pressure (i.e., 212° F. or 100° C.). In this regard, it should be understood that the concept of dyeing copolyester fibers and spandex fibers includes dyeing the blend in the form of blended yarns and blended fabrics. It is emphasized that, as used herein, the term "copolyester fibers" broadly refers to cut copolyester fibers, (e.g., staple fibers), and uncut copolyester filaments, (e.g., POY).

Dyeing copolyester fibers and spandex fibers at reduced temperatures prevents the degradation of the stretch properties possessed by spandex. In conventional polyester-spandex blended textiles, dyeing temperatures of about 265° F. are required to adequately dye the conventional polyester fibers. Unfortunately, such high temperatures weaken such high-power stretch polyurethane filaments. Consequently, dyeing blends of copolyester and spandex at lower temperatures is advantageous.

In other embodiments of the method, copolyester fibers, whether staple fibers or POY, are blended with cotton fibers. The preferred copolyester/cotton blends include between about 5 percent and 95 weight percent cotton fibers with the remainder comprising the copolyester fibers. Most preferably, the blend includes between about 30 weight percent and 70 weight percent cotton fibers with the remainder comprising the polyester fibers. In this regard, the invention provides the opportunity to increase the synthetic content of blended cotton and polyester yarns to take advantage of the desirable characteristics of the copolyester in the resulting yarns and fabrics. For example, unlike conventional unmodified polyester filaments, the copolyester filaments formed according to the present method possess static-dissipation properties that are substantially similar to cotton. Moreover, the present copolyester filaments retain the desirable dimensional stability characteristics of conventional polyesters.

Those familiar with textile terminology will understand that "spinning" refers to two different processes. In one sense, the term "spinning" refers to the production of synthetic polymer filaments from a polymer melt. In its older, conventional use, the term "spinning" refers to the process of twisting a plurality of individual fibers into yarns. The use of both of these terms is widespread and well understood in this art such that the particular use herein should be easily recognized by those of ordinary skill in the art.

Conventional techniques of polymerizing polyester and spinning filaments are well known by those having ordinary skill in the art. Accordingly, the following example highlights the inventor's modifications to conventional process steps to achieve an especially desirable fabric.

EXAMPLE

Melt Polymerization—The copolyester composition was polymerized like standard polyethylene terephthalate, except that the polymerization temperature was 10° C. lower than normal. Polyethylene glycol, having an average molecular weight of 400 g/mole, was injected into the process before the initiation of the polymerization at a rate sufficient to yield 10 weight percent polyethylene glycol in the copolyester composition. Likewise, pentaerthyritol was added before polymerization at a rate that would yield 500 ppm in the copolyester composition. The copolyester was then extruded, quenched, and cut. The quench water was 10° C. colder than normal. The copolyester was crystallized 10° C. lower than normal. The copolyester was melt polymerized to an intrinsic viscosity of 0.62 dl/g.

Solid State Polymerization—The copolyester chip was solid state polymerized like a normal polyethylene terephthalate bottle resin chip except that the chip was maintained at 190° C. for five hours. The intrinsic viscosity of the copolyester chip was increased in the solid phase to about 0.77 d/g.

Filament Spinning—The copolyester formed POY like a conventional polyethylene terephthalate product having the same filament count, except that the spinning speed was reduced by seven percent and the spinning temperature was reduced by 15° C.

Texturing—The POY was textured on a contact heater false twist texturing machine with polyurethane disks. The POY processed like standard polyethylene terephthalate POY except that the 100-filament product used a 2-5-1 stainless-polyurethane-stainless disk stack. Moreover, the temperature was about 50° C. to 60° C. below normal primary-heater temperatures. Finally, the secondary heater was not used, yielding a stretch textured yarn.

Fabric Formation—Fabric formation was identical to conventional techniques.

Dyeing—Dyeing was the same as conventional techniques except that no carrier was used and the batch was held at a dye temperature of 220° F. for 30 minutes.

Finishing—Finishing was the same as conventional techniques except that the zone temperature was reduced 10° C. and no finish was used in the pad.

In the drawings and the specification, typical embodiments of the invention have been disclosed. Specific terms have been used only in a generic and descriptive sense, and not for purposes of limitation. The scope of the invention is set forth in the following claims.

That which is claimed is:

1. A method of preparing polyethylene glycol modified copolyester filaments, comprising:

copolymerizing polyethylene glycol and a chain branching agent into polyethylene terephthalate in the melt phase to form a copolyester composition;

wherein the polyethylene terephthalate is present in the copolyester composition in an amount sufficient for a filament made from the copolyester composition to possess dimensional stability properties substantially similar to those of conventional polyethylene terephthalate filaments;

wherein the polyethylene glycol has an average molecular weight less than about 5000 g/mol and is present in an amount sufficient for a filament made from the copolyester composition to possess wicking, drying, and static-dissipation properties that are superior to those of conventional polyethylene terephthalate filaments; and wherein the chain branching agent is present in the copolyester composition in an amount of less than about 0.0014 mole-equivalent branches per mole of standardized polymer, the standardized polymer being unmodified polyethylene terephthalate;

thereafter polymerizing the copolyester composition in the solid phase until the copolyester composition is capable of achieving a melt viscosity that facilitates the spinning of filaments; and thereafter spinning filaments from the copolyester composition.

2. A method of preparing copolyester filaments according to claim 1, wherein the weight fraction of polyethylene glycol in the copolyester composition is between about 4 percent and 20 percent.

3. A method of preparing copolyester filaments according to claim 1, wherein the weight fraction of polyethylene glycol in the copolyester composition is between about 8 percent and 14 percent.

4. A method of preparing copolyester filaments according to claim 1, wherein the weight fraction of polyethylene glycol in the copolyester composition is between about 10 percent and 12 percent.

5. A method of preparing copolyester filaments according to claim 1, wherein:

the chain branching agent is pentaerythritol; and the pentaerythritol is present in the copolyester composition in an amount of less than 500 ppm.

6. A method of preparing copolyester filaments according to claim 1, wherein:

the weight fraction of polyethylene glycol in the copolyester composition is between about 10 percent and 12 percent; and the step of polymerizing the copolyester composition in the solid phase comprises solid state polymerizing the copolyester composition until the copolyester is capable of achieving a melt viscosity of between about 2500 and 3000 poise when heated to 260° C.

7. A method of preparing copolyester filaments according to claim 1, wherein the weight fraction of polyethylene glycol in the copolyester composition and the intrinsic viscosity of the copolyester after solid state polymerization are defined by the shaded region of FIG. 1.

8. A method of preparing copolyester filaments according to claim 1, wherein:

the step of copolymerizing polyethylene glycol and chain branching agent into polyethylene terephthalate in the melt phase comprises copolymerizing polyethylene glycol and chain branching agent into polyethylene terephthalate in the melt phase to an intrinsic viscosity of less than about 0.65 dl/g; and the step of polymerizing the copolyester composition in the solid phase comprises further polymerizing the copolyester composition in the solid phase to an intrinsic viscosity greater than the intrinsic viscosity achieved via the melt polymerization.

9. A method of preparing copolyester filaments according to claim 8, wherein the step of copolymerizing polyethylene glycol and chain branching agent into polyethylene terephthalate in the melt phase comprises copolymerizing polyethylene glycol and chain branching agent into polyethylene terephthalate in the melt phase to an intrinsic viscosity of less than about 0.60 dl/g.

10. A method of preparing copolyester filaments according to claim 8, wherein the weight fraction of polyethylene glycol in the copolyester composition and the intrinsic viscosity of the copolyester after solid state polymerization is defined by the shaded region of FIG. 1.

11. A method of preparing copolyester filaments according to claim 1, further comprising the step of forming the copolyester composition into chips after the step of copolymerizing polyethylene glycol and a chain branching agent into polyethylene terephthalate in the melt phase and before the step of polymerizing the copolyester composition in the solid phase.

12. A method of preparing polyethylene glycol modified copolyester filaments, comprising:

copolymerizing polyethylene glycol and chain branching agent into polyethylene terephthalate in the melt phase to form a copolyester composition having an intrinsic viscosity of less than about 0.65 dl/g;

wherein the polyethylene terephthalate is present in an amount sufficient for a filament made from the copolyester composition to possess dimensional stability properties substantially similar to those of conventional polyethylene terephthalate filaments;

wherein the polyethylene glycol has an average molecular weight less than about 5000 g/mol and is present in an amount sufficient for a filament made from the copolyester composition to possess wicking, drying, and static dissipation properties that are superior to those of conventional polyethylene terephthalate filaments; and wherein the chain branching agent is present in the copolyester composition in an amount of less than about 0.0014 mole-equivalent branches per mole of standardized polymer;

thereafter polymerizing the copolyester composition in the solid phase until the copolyester is capable of achieving a melt viscosity of at least about 2000 poise when heated to 260° C.; and thereafter spinning filaments from the copolyester composition.

13. A method for producing copolyester filaments according to claim 12, further comprising dyeing the copolyester filaments at a temperature of less than about 240° F.

14. A method for producing copolyester filaments according to claim 13, wherein the step of dyeing the copolyester filaments at a temperature of less than about 240° F. comprises dyeing the copolyester filaments at or below a temperature defined by the boiling point of water at atmospheric pressure.

15. A method of preparing copolyester filaments according to claim 12, wherein the weight fraction of polyethylene glycol in the copolyester composition is between about 4 percent and 20 percent.

16. A method of preparing copolyester filaments according to claim 12, wherein the weight fraction of polyethylene glycol in the copolyester composition is between about 8 percent and 14 percent.

17. A method of preparing copolyester filaments according to claim 12, wherein the weight fraction of polyethylene glycol in the copolyester composition is between about 10 percent and 12 percent.

18. A method of preparing copolyester filaments according to claim 12, wherein the weight fraction of polyethylene glycol in the copolyester composition and the intrinsic viscosity of the copolyester after solid state polymerization is defined by the shaded region of FIG. 1.

19. A method of preparing copolyester filaments according to claim 12, wherein:

the chain branching agent consists essentially of pentaerythritol; and the pentaerythritol is present in the copolyester composition in an amount of less than 500 ppm.

20. A method of preparing copolyester filaments according to claim 12, further comprising the step of forming the copolyester composition into chips after the step of copolymerizing polyethylene glycol and a chain branching agent into polyethylene terephthalate in the melt phase and before the step of polymerizing the copolyester composition in the solid phase.

* * * * *